United States Patent [19]

West et al.

[11] 4,327,196

[45] Apr. 27, 1982

[54] METHOD FOR PRODUCING EXPANDED AND CURED POLYESTER RESIN

[75] Inventors: Robert W. West, Memphis, Tenn.; Paul E. Stott, Cheshire; James Ahnemiller, Middlebury, both of Conn.

[73] Assignees: Uniroyal, Inc., New York, N.Y.; Alpha Chemical Corporation, Colliersville, Tenn.

[21] Appl. No.: 219,420

[22] Filed: Dec. 22, 1980

[51] Int. Cl.$^3$ .............................................. C08J 9/00
[52] U.S. Cl. .................................... 521/120; 521/54; 521/124; 521/125; 521/128; 521/182

[58] Field of Search ................. 521/182, 54, 124, 128, 521/120, 125

[56] References Cited

U.S. PATENT DOCUMENTS

| 3,920,589 | 11/1975 | Jacobs et al. | 521/54 |
| 3,920,590 | 11/1975 | Jacobs et al. | 521/54 |
| 3,920,591 | 11/1975 | Jacobs et al. | 521/54 |

*Primary Examiner*—Morton Foelak
*Attorney, Agent, or Firm*—James J. Long

[57] ABSTRACT

Polyester resin is expanded and cured using mono-substituted sulfonyl hydrozide blowing agent, organic peroxide curative and certain metal promoters.

18 Claims, No Drawings

METHOD FOR PRODUCING EXPANDED AND CURED POLYESTER RESIN

The present invention provides a method for simultaneously foaming and curing a polyester resin using mono-substituted sulfonyl hydrazides, organic peroxide and certain metal promoters as well as a composition capable of providing a cured and expanded polyester product.

The use of certain sulfonyl hydrazides for preparing polyester foams has been disclosed in these references of interest: U.S. Pat. No. 3,920,590, Nov. 18, 1975 (Jacobs, et al) teaches the use of sulfonyl hydrazides at very high concentrations of peroxide catalyst and of cobalt promoter; and U.S. Pat. No. 3,920,591, Nov. 18, 1975 (Jacobs, et al), discloses the use of sulfonyl hydrazides in conjunction with aliphatic amine redox compounds.

Neither the methods of the references above nor any other processes known have proved of commercial interest or success because of high cost or impracticality. It is believed that the instant invention is a significant improvement over previous methods and provides the industry with a viable and practical method for making foamed and cured polyester products at reduced cost.

It has now been found that polyester resins (PER) can be expanded and cured simultaneously when employing mono-substituted sulfonyl hydrazides (MRSH), a primary organic metal salt promoter, with or without a secondary organic metal salt promoter, a surfactant and an organic peroxide or hydroperoxide at low concentrations of peroxide and promoters.

Specifically, this invention provides low density foams prepared from liquid ethylenically unsaturated polyester resins by blending various ingredients as outlined on the listing below.

| Ingredient | General | Preferred | Most Preferred |
|---|---|---|---|
| (a) Polyester resin, parts | 100 | 100 | 100 |
| (b) MRSH blowing agent, millimoles | 2.7–32 | 5.4–27 | 11–22 |
| (c) Primary promoter, parts | 0.001–2 | 0.001–1.5 | 0.01–1 |
| (d) Secondary promoter, parts | 0–0.4 | 0–0.25 | 0.01–0.2 |
| (e) Surface active agent, parts | 0–2 | 0.5–1.5 | 0.75–1.25 |
| (f) Filler, parts | 0–250 | 0–150 | 0–100 |
| (g) Organic peroxide (or hydroperoxide) curative, [per 100 parts of (a) plus (f)] | 0.2–2.5 | 0.5–2 | 1–2 |

The following guidelines may be useful for the practitioner: if no (d) is present, then the amount of (c) is at least 0.01, preferably at least 0.025 part. Also, if no (d) is present and the level of (c) is at least 0.01 part, then the concentration of (b) should preferably be at least about 11 millimoles, and that of (g) greater than two parts. It should also be noted that if (b) is present at a 5.5 millimole or higher level, and (g) is present at one part or more, the concentration of (c) should preferably be at least about 0.5 part in the absence of (d).

Using the proper concentrations of components, foamed polyester structures may be obtained exhibiting at least 10 percent, usually at least 20 percent, and most preferably at least 30 percent or more of density reduction when compared to the non-foamed polyester resin.

The liquid unsaturated polyester resins in the composition comprise a linear or only slightly branched polyester resin and an ethylenically unsaturated monomeric compound. The resin, per se, is typically prepared as a condensation or polyesterification reaction product of an unsaturated polybasic and a polyhydric compound; for example, the condensation product of an unsaturated dibasic acid of alpha-beta ethylenic unsaturation or a di- or trihydric compound, such as a glycol. Often a saturated polybasic acid or anhydride, such as a dibasic acid, is employed with the unsaturated acid or anhydride to modify the reactivity of the unsaturated resin.

Examples of saturated polybasic acids include, but are not limited to: isophthalic acid; orthophthalic acid, terephthalic acid, tetrabromophthalic acid, tetrachlorophthalic acid, tetrahydrophthalic acid, adipic acid, succinic acid, azelaic acid, glutaric acid, nadic acid and the various anhydrides obtained therefrom. Unsaturated polybasic acids include, but are not limited to: maleic acid, fumaric acid, itaconic acid, citraconic acid and anhydrides obtained therefrom.

At times, unsaturated acid or anhydride substituted bridged ring polyenes are used to modify cure characteristics of the resins.

Typical polyhydric alcohols include, but are not limited to: ethylene glycol, 1,2-propane diol; 1,3-propane diol, diethylene glycol, diproplylene glycol, triethylene glycol, tripropylene glycol, 1,2-butane diol, 1,3-butane diol, 1,4-butane diol, neopentyl glycol, 2,2,5-trimethylpentane diol, cyclohexanedimethylol, dibromoneopentyl glycol, dibromobutane diol, trimethylolpropane, pentacrythrito-, trimethylpentane diol, dipropoxy adducts of bis phenol A, and dipropoxy adducts of hydrogenated bis phenol A.

Examples of ethylenically unsaturated monomers employed with the linear polyesters include, but are not limited to: styrene, vinyl toluene, acrylates and methacrylates like methylmethacrylate, alphamethyl styrene, chloro styrene, and diallyl phthalate. The ratio of the resin, per se, to unsaturated monomer may vary from 75/25 to 50/50 by weight. See, for example, U.S. Pat. Nos. 2,255,313, Ellis, Sept. 9, 1941, 2,667,430, Wells, Jan. 26, 1954; or 3,267,055, Amidon, Aug. 15, 1966, for further details of suitable polyester compositions comprising an unsaturated linear [or slightly branched] polyester and a copolymerizable ethylenic monomer which is a solvent for the polyester to provide a liquid composition capable of cross-linking to a solid state in the presence of a peroxide [or hydroperoxide] catalyst or polymerization initiator. Unless otherwise indicated, the expressions "polyester" or "polyester resin" as used herein have reference to such a composition.)

The liquid unsaturated polyester resins also typically contain small amounts of inhibitors in order to prevent premature reaction, such as hydroquinone, quinone and tertiary butyl catechol, as well as a wide variety of other additives such as: viscosity index improvers, rheological agents, flame retardants, thermoplastic polymers, pigments, dyes, stabilizers, glass fibers, release agents, extenders, alumina surfactants and other additives. Fillers may also be included in polyester resins such as hollow glass or plastic microsphere beads, wood flour, silica, diatamacieous earth, ground glass, etc. Filler levels may be as high as 70 percent by weight, usually 0 to 60 percent.

The various components of the polyester resins may be varied as is known in the art to impart the desired properties to the cured resin. Flexible resins employ greater amounts of adipates or azeleates, while more rigid resins use phthalates, with a variety of different glycols. This invention is useful for making rigid and semirigid polyester foams suitable as structural-type foams. Such resins have a formulation, for example, of about 3 to 5 moles of glycol, 1.5 to 3.0 moles of adipic acid, and 0 to 1.5 moles of phthalic anhydride, with from 1.0 to 2.5 moles of styrene or vinyl toluene.

Resin containing higher amounts of linear dibasic glycols and linear dibasic acids, e.g., over 70%, while maintaining a low amount of aromatic dihydric acids and anhydrides, unsaturated acids, and monomers, exhibit a higher degree of elasticity. Formulating for these properties becomes limited by the desired rigidity and heat resistance properties of the finished foam product.

The liquid unsaturated polyester resins are employed in conjunction with a free-radical curing compound or a compound capable of forming a free radical. The cross-linked initiating compound is usually an organic (hydro-) peroxide. Such peroxides are characterized by their reaction with metal salts or metal soaps which are a general class of agents known as accelerators or promoters. Suitable peroxides include, but are not limited to saturated aliphatic hydroperoxides, olefinic hydroperoxides, aralkyl hydroperoxides, hydroperoxides of cycloaliphatic and heterocyclic organic molecules, dialkyl peroxides, transanular peroxides, peroxyesters, peroxy derivatives of aldehydes and ketones, hydroxyalkyl hydroperoxides, bis(hydroalkyl) peroxides, polyalkylidene peroxides, peroxy acetals, methyl hydroperoxide, ethyl hydroperixde, t-butyl hydroperoxide, dimeric benzaldehyde peroxide, dimeric benzophenone peroxide, demeric acetone peroxide, methylethyl ketone hydroperoxide, etc.

It should be noted that these organic (hydro-) peroxides are not available in commerce at 100 percent concentrations. Rather, they are used diluted in a suitable carrier such as an organic solvent. In addition, the so-called active oxygen content of such commercial peroxides may vary depending on the type of peroxides as well as storage conditions and age. Nevertheless, the amounts of peroxide stated reflect the total peroxide compositions usually containing about 50% peroxide compound. Proper adjustment of peroxide concentrations in the polyester resins may have to be made when using peroxide compositions containing substantially lower levels of active peroxide (for further information see Jacyzyn et al, "Methyl ethyl ketone peroxides, relationship of reactivity to chemical structure," paper presented at 32nd Annual Technical Conference, 1977 Society of the Plastics Industry).

Preferred peroxides are alkoxy peroxides which are activated at relatively low or ambient temperature, i.e., as low as 15° C., normally at about 20°-50° C. The most preferred peroxide is methyl ethyl ketone peroxide.

In order to carry out this invention the addition of a primary promoter is essential. Under primary promoter is understood an organic metal salt participating in the curing and expansion of the polyester resin composition and causing gelation of such compositions of no more than ten minutes when used as the sole promoter. Such primary promoters are based on metals selected from copper and vanadium. The organic anions of such salts may be derived from a variety of organic acids having from two to 20 carbon atoms and include acetic acid, propionic acid, butyric acid, 2-ethylhexanoic acid, hexanoic acid, octoic acid, aluric acid, oleic acid, linoleic acid, palmitic acid, stearic acid, naphthenic acid; also complexes of such metals with acetoacetone. The preferred primary promoters are salts based on copper, especially 2-ethylhexanoate, octoate and naphthenate. As secondary promoters are suitable organic salts obtained from cobalt, cadmium, manganese, tin, lead, zirconium, chromium, lithium, calcium, nickel, iron and potassium, and organic acids outlined above. The preferred secondary promoters are cobalt octoate and naphthenate. Usually the metal concentration of commercially available promoters ranges from 8-12% by weight. Adjustments of required levels may be necessary if such concentration is substantially outside that range.

The chemical blowing agents suitable for preparing the foamed and cured polyester are mono-substituted sulfonyl hydrazide having the structural formula $RSO_2NHNH_2$, wherein R is a hydrocarbyl radical selected from $C_1-C_{12}$ alkyl, $C_5-C_6$ cycloalkyl, $C_7-C_{10}$ aralkyl, phenyl, naphthyl, also phenyl substituted with halogen, $C_1-C_{12}$ alkyl, or $C_1-C_{12}$ alkoxy. Especially suitable are such sulfonyl hydrazides wherein R is $C_2-C_4$ alkyl, benzyl, phenyl substituted with chlorine or $C_1-C_{12}$ alkyl. Examples of suitable sulfonyl hydrazides are methanesulfonyl hydrazide, ethanefulfonyl hydrazide, 1- or 2-propanesulfonyl hydrazide, n-butanesulfonyl hydrazide, sec-butanesulfonyl hydrazide, tert-butanesulfonyl hydrazide isobutanesulfonyl hydrazide, pentanesulfonyl hydrazide, hexanesulfonyl hydrazide, heptanesulfonyl hydrazide, octanesulfonyl hydrazide, nonanesulfonyl hydrazide, decanesulfonyl hydrazide, dodeanesulfone hydrazide, cyclopentanesulfonyl hydrazide, cyclohexanesulfonyl hydrazide, benzenesulfonyl hydrazide, naphtalenesulfonyl hydrazide, toluenesulfonyl hydrazide, ethylbenzenesulfonyl hydrazide, demethylbenzenesulfonyl hydrazide, butylbenzenesulfonyl hydrazide, hexylbenzenesulfonyl hydrazide, oxtylbenzenesulfonyl hydrazidem decylbenzenesulfonyl hydrazide, dodecylbenzenesulfonyl hydrazide, methoxybenzenesulfonyl hydrazide, ethoxybenzenesulfonyl hydrazide, butoxybenzenesulfonyl hydrazide, hexoxybenzenesulfonyl hydrazide, decoxybenzenesulfonyl hydrazide, dodecoxybenzenefulfonyl hydrazide, chlorobenzenesulfonyl hydrazide, fluorobenzenesulfonyl hydrazide, bromobenzenesulfonyl hydrazide, iodobenzenesulfonyl hydrazide, benzylsulfonyl hydrazide, phenethanesulfonyl hydrazide, phenylpropanesulfonyl hydrazide, phenylbutanesulfonyl hydrazide, phenylhexanesulfonyl hydrazide.

Surfactants suitable for making polyester foam are well known to the art. Silicone alkylene glycol co- and block co-polymers are preferred, although others are applicable such as ethyoxylated alkylphenols and fluorohydrocarbons. Representative examples are nonylphenyl polyethylene glycol ether, nonylphenoxy poly(ethyleneoxy)ethanol, di-tridecyl sodium succinate, stearyl dimethylbenzylammonium chloride, block co-polymers of dimethylpolysiloxane with poly)ethyleneoxide or poly(propyleneoxide) and the like.

Although the effect of surface active agents is beneficial toward cell stabilization, they are not essential for carrying out the invention.

It has been discovered that poly-hydrazides such a bis-hydrazides are not suitable for the purpose of this invention. Typical examples for such bis-hydrazides are oxybis(benzenesulfonyl hydrazide) and biphenylenebis(sulfonyl hydrazide).

The foamed and cured polyesters according to this invention can be obtained in various ways, i.e., all of the ingredients except for the organic (hydro-) peroxide may be premixed and the peroxide then blended in shortly prior to manufacture of the foamed products. Alternatively, to a portion of the total polyester resin (10 to 90% by weight of the total polyester) may be added all the components except the peroxide catalyst, the latter being blended with a second portion the remaining 90 to 10% (of the polyester) of the resin; both portions are then mixed together. The final composition, being within the limits outlined previously, will provide the desired foamed and cured product. Variations of the above may be adopted according to the particular need and circumstance. Thus, one embodiment of the invention involves initially mixing some or all of the polyesteer (i.e., from 10 to 100 parts of polyester) with ingredients (b), (c), (d), (e) and (f), that is, everything except the organic (hydro-) peroxide curative. This mixture is useful for subsequent admixture with the curative and (if less than 100 parts of polyester was used initially) with additional polyester (up to 90 parts) to bring the total amount of polyester to 100 parts.

The compositions of this invention are suitable for casting and spray applications when making products such as shower stalls, bathtubs, furniture, automotive body parts, paneling, packaging, floatation articles, air conditioner and humidifier housings, snowmobile front ends, lawnmower housings; bus, truck and tractor components; laminar structures, boats, and the like.

In spray applications, the same general approach as mentioned above may be used. Generally, spray application calls for short gel time, and the final composition is usually achieved by employing either internally or externally mixing spray guns, as is well known to the art.

In order to carry out this invention, the practitioner will realize that peroxide and primary, and optionally secondary promoters should be added at levels at the higher end of the described limits when thin sheet-like products are manufactured whereas lower such levels are advisable when relatively thick parts are produced in order to avoid unnecessarily high exotherm.

The expansion and cure of the polyester resin composition is effected simply by exposing the described mixture to expanding and curing conditions. For this purpose ordinary ambient conditions are suitable, since the reaction proceeds spontaneously after the ingredients are mixed. Application of heat is not necessary; the reaction itself is exothermic. If desired, heat may be applied, particularly in a post curing stage.

The following examples demonstrate more specifically this invention.

Definitions of ingredients used:

PER-1: Polyester resin which is 65 parts of a reaction product of phthalic anhydride (41%), maleic anhydride (20%) propylene glycol (28%) and diethlene glycol (11%) blended with 35 parts of styrene, all by weight.

PER-2: Polyester resin blend of 40 parts styrene and 60 parts reaction product of isophthalic anhydride (1 mol), maleic anhydride (1 mol) and propylene glycol (2 mols).

PER-3: Polyester resin blend of 60 parts reaction product of phthalic anhydride (22%), maleic anhydride (30%) and diethylene glycol (48%) with 40 parts styrene.

MEKP: Methyl ethyl ketone peroxide (50% in plasticizer)

Cu-8: Copper naphthenate (8% Cu)
Co6: Cobalt naphthenate (6% Co)
Co-12: Cobalt octoate (12% Co)
Ni-10: Nickel 2-ethylhexanoate (10% Ni)
V-4: Vanadium decanoate (4% V)
Fe-6: Iron naphthenate (6% Fe)
MSH: Methanesulfonyl hydrazide (M.W. 110)
ESH: Ethanesulfonyl hydrazide (124)
BSH: n-Butanesulfonyl hydrazide (152)
PSH: Benzenesulfonyl hydrazide (172)
TSH: p-Tuluenesulfonyl hydrazide (186)
BBSH: p-t--Butylbenzenesulfonyl hydrazide (228)
DBSH: Dodecylbenzenesulfonyl hydrazide (340)
CBSH: p-Chlorobenzenesulfonyl hydrazide (206)
BLSH: Benzylsulfonyl hydrazide (186)
OBSH: Oxybis(benzenesulfonyl hydrazide) (358)
BPSH: Biphyenylenebis(sulfonyl hydrazide) (342)
SAA: Surface active agent, poly(dimethylsiloxane-ethylene oxide) block co-polymer.

EXAMPLE 1

To a 215 ml wax-coated paper cup were introduced 100 g PER-1, 2 g toluenesulfonyl hydrazide, 0.01 g copper naphthenate (8% Cu) and 1 g surfactant (silicone-glycol liquid copolymer, Dow Corning (trademark) 193). The mixture was stirred thoroughly with an electric mixer until all ingredients were dissolved. The reaction mixture was continued to be stirred slowly while introducing 2 g MEKP. Development of gel was observed by the so-called snap-back method, i.e., about every 10 seconds, a small glass rod was introduced into surface of the resin (ca. 5 mm) and quickly removed. When the polyester resin tended to snap back rather than to flow from the rod, then the time elapsed from beginning to peroxide introduction to the snap-back point was recorded as gel time.

After the reaction exotherm had dissipated, the density of the product was measured by water immersion.

The results of this experiment are recorded in Table I.

EXAMPLES 2–9

Following essentially the procedure described in Example 1, additional experiments were undertaken with various ingredients as indicated in Table I. Examples 7, 8 and 9 are outside the invention.

As can be seen from the Table I results, the primary (copper) promoter, with the mono-substituted sulfonyl hydrazide, can be used alone even at extraordinarily low concentrations. Although at low levels the degree of expansion remains low, at higher primary promoter levels considerable density reduction is achieved. Contrary to the experiments carried out with mono-substituted sulfonyl hydrazides, no foam developed when employing polyfunctional sulfonyl hydrazides (Ex. 7 and 8) and when using the general recipe providing best results (Ex. 4). Example 9 indicates the criticality of peroxide and blowing agent levels at low (100 ppm) copper promoter concentration.

TABLE I

| Example | 1 | 2 | 3 | 4 | 5 | 6 | 7 | 8 | 9 |
|---|---|---|---|---|---|---|---|---|---|
| PER-1, g. | 100 | 100 | 100 | 100 | 100 | 100 | 100 | 100 | 100 |
| TSH, g[1] | 2 | 4 | 4 | 4 | 5 | 1 | — | — | 1 |
| OBSH, g[2] | — | — | — | — | — | — | 4 | — | — |
| BPSH, g[3] | — | — | — | — | — | — | — | 4 | — |
| SAA, g | 1 | 1 | 1 | 1 | 1 | 1 | 1 | 1 | 1 |
| Cu-8, g | 0.01 | 0.01 | 0.025 | 1.0 | 1.5 | 1.0 | 1.0 | 1.0 | 0.01 |
| MEKP, g | 2 | 1 | 1 | 2 | 2 | 2 | 1 | 1 | 1 |
| Gel time, sec. | 75 | 305 | 136 | 20 | 10 | 24 | 290 | 720 | 75 |
| F.D.[4], g/cm$^3$ | 0.87 | 0.88 | 0.88 | 0.40 | 0.47 | 0.68 | 1.1 | 1.1 | 1.1 |
| D. Red'n[5], % | 21 | 20 | 20 | 64 | 57 | 38 | 0 | 0 | 0 |

Remarks:
[1] Molecular weight 186
[2] Equivalent weight 179
[3] Equivalent weight 171
[4] Foam density
[5] Density Reduction

EXAMPLES 10-15

Following the general procedure of Example 1 experiments were carried out determining the effects of a secondary promoter (i.e., cobalt octoate) in combination of the primary promoter (copper naphthenate). The ingredients and results are summarized in Table II. Example 15 is outside this invention.

It will be noted from the results that a system containing a blowing agent of this invention and a secondary promoter is highly sensitive to the presence of a primary promoter even at the latter's concentration of as low as 10 parts per million (ppm) resulting in good density reduction at reasonable gel time. In the absence of the primary promoter no satisfactory results were achieved, (Example 15).

TABLE II

| Example | 10 | 11 | 12 | 13 | 14 | 15 |
|---|---|---|---|---|---|---|
| PER-1, g | 100 | 100 | 100 | 100 | 100 | 100 |
| TSH, g | 4 | 4 | 4 | 4 | 5 | 4 |
| SAA, g | 1 | 1 | 1 | 1 | 0.75 | 1 |
| Cu-8, g | 0.11 | 0.05 | 0.2 | 0.5 | 0.001 | — |
| Co.-12, g | 0.05 | 0.05 | 0.05 | 0.01 | 0.25 | 0.2 |
| MEKP, g | 2 | 1 | 1 | 2 | 1 | 1 |
| Gel time, sec. | 30 | 65 | 27 | 25 | 270 | 600+ |
| F.D., g/cm$^3$ [1] | 0.55 | 0.71 | 0.63 | 0.46 | 0.73 | —* |
| D. Red'n[2], % | 50 | 35 | 43 | 58 | 34 | —* |

Remarks:
[1] Foam density
[2] Density reduction
*Not determined because of too long (10+ minutes) gel time

EXAMPLES 16-24

The general procedure of Example 1 was essentially adopted to evaluate additional mono-substituted sulfonyl hydrazides for the purpose of this invention. The concentration of all blowing agents were kept at about 220 mmoles per 100 parts of PER with the exception of Example 16 where 27 mmoles of MSH were added.

The data in Table III indicate that all monosubstituted sulfonyl hydrazides provide essentially similar results under the conditions used. It may be noteworthy to know that some mercaptan-like odor was given off by Examples 17, 18 and 24 during foaming/curing stage.

TABLE III

| Example | 16 | 17 | 18 | 19 | 20 | 21 | 22 | 23 | 24 |
|---|---|---|---|---|---|---|---|---|---|
| PER-2, g. | 100 | 100 | 100 | 100 | 100 | 100 | 100 | 100 | 100 |
| MSH, g | 3.0 | — | — | — | — | — | — | — | — |
| ESH, g | — | 2.6 | — | — | — | — | — | — | — |
| BSH, g | — | — | 3.0 | — | — | — | — | — | — |
| PSH, g | — | — | — | 3.4 | — | — | — | — | — |
| TSH, g | — | — | — | — | 3.75 | — | — | — | — |
| BBSH, g | — | — | — | — | — | 4.5 | — | — | — |
| DBSH, g | — | — | — | — | — | — | 7.1 | — | — |
| CBSH, g | — | — | — | — | — | — | — | 4.1 | — |
| BLSH, g | — | — | — | — | — | — | — | — | 3.75 |
| SAA, g | 1 | 1 | 1 | 1 | 1 | 1 | 1 | 1 | 1 |
| Cu-8, ppm | 25 | 25 | 25 | 25 | 25 | 25 | 25 | 25 | 25 |
| Co-12, g | 0.3 | 0.3 | 0.3 | 0.3 | 0.3 | 0.3 | 0.3 | 0.3 | 0.3 |
| Gel time, sec. | 190 | 60 | 80 | 80 | 90 | 90 | 90 | 70 | 79 |
| F.D., g/cm$^3$ | 0.80 | 0.67 | 0.66 | 0.80 | 0.69 | 0.68 | 0.66 | 0.70 | 0.69 |
| D. Red'n, % | 27 | 39 | 40 | 27 | 37 | 38 | 40 | 36 | 37 |

EXAMPLE 25

According to the method described in Example 1 the following ingredients were blended:

| | |
|---|---|
| PER-3 | 100 parts |
| TSH | 4 parts |
| SAA | 1 part |
| Cu-8 | 0.1 parts |
| Filler* | 100 parts |
| MEKP | 4 parts |

*Mixture of 50 parts aluminum trihydrate and 50 parts calcium carbonate

The mixture gelled within 16 seconds providing an excellent, cured foamed product, having density of 0.63 g/cm$^3$.

EXAMPLES 26 & 27

The general procedure of Example 1 was used for evaluating another primary promoter. The recipes and results are presented in Table IV.

TABLE IV

| Example | 26 | 27 |
|---|---|---|
| PER-1 | 100 | 100 |
| TSH | 4 | 4 |

TABLE IV-continued

| Example | 26 | 27 |
|---|---|---|
| SAA | 1 | 1 |
| V-4 | 0.2 | 1 |
| MEKP | 2 | 2 |
| Gel time, sec. | 360 | 36 |
| F.D., g/cm³ | 0.67 | 0.60 |
| D. Red'n, % | 43 | 50 |

As the data indicate, useful cured and expanded polyester product can be obtained with organovanadium salt promoter.

EXAMPLES 28 & 29

The combination of a primary vanadium promoter and a secondary nickel promoter was evaluated using the general procedure of Example 1. The recipes used and results obtained are shown in Table V.

The results indicate that foamed and cured polyester resin may be successfully prepared with this combination of curing agent and promoters.

TABLE V

| Example | 28 | 29 |
|---|---|---|
| PER-1, g | 100 | 100 |
| TSH, g | 4 | 4 |
| SAA, g | 1 | 1 |
| V-4, g | 0.05 | 0.2 |
| Ni-10, g | 0.05 | 0.2 |
| MEKP, g | 2 | 2 |
| Gel time, sec. | 480 | 240 |
| F.D., g/cm³ | 0.85 | 0.75 |
| D. Red'n, % | 23 | 32 |

EXAMPLES 30 & 31

In these examples cumene hydroperoxide (CHP) was employed as the curing agent. The procedure followed essentially that of Example 1 using the following ingredients:

| Example | 30 | 31 |
|---|---|---|
| PER-1 | 100 | 100 |
| TSH | 4 | 4 |
| SAA | 1 | 1 |
| Cu-8 | 0.05 | 0.5 |
| Co-12 | 0.2 | — |
| CHP | 2 | 2 |
| Gel time, sec. | 28 | 20 |
| F.D., g/cm³ | 0.80 | 0.48 |
| D. Red'n, % | 27 | 56 |

It is evidenced by the results that a hydroperoxide may be substituted for a peroxide.

Having thus described the invention, what is claimed is:

1. A foamable and curable polyester composition consisting essentially of, all parts being by weight:
   (a) 100 parts liquid unsaturated polyester resin,
   (b) 2.7-32 millimoles mono-substituted sulfonyl hydrazide blowing agent for the resin having the structural formula $RSO_2NHNH_2$, wherein R is $C_1-C_{12}$ alkyl, $C_5-C_6$ cycloalkyl, $C_7-C_{10}$ aralkyl, phenyl, naphthyl or phenyl substituted with halogen, $C_1-C_{12}$ alkyl or $C_1-C_{12}$ alkoxy,
   (c) 0.001-2 parts organic metal salt primary promoter for the organic peroxide or organic hydroperoxide cure of the resin wherein the metal is selected from copper and vanadium,
   (d) 0-0.4 part organic metal salt secondary promoter for the organic peroxide or organic hydroperoxide cure of the resin, wherein the metal is selected from cadmium, calcium, chromium, cobalt, iron, lead, lithium, manganese, nickel, tin and zirconium,
   (e) 0-2 parts surface active agent,
   (f) 0-250 parts filler,
   (g) 0.5-2.5 parts organic peroxide or organic hydroperoxide per 100 parts (a) plus (f); provided that if the amount of (d) is zero the amount of (c) is at least 0.01 part.

2. The composition of claim 1 wherein the concentration of (b) is 5.4-27 millimoles, that of (c) is 0.001-1.5 parts, that of (d) is 0-0.25 part, that of (e) is 0.5-1.5 parts, that of (f) is 0-150 parts, and that of (g) is 1-2 parts.

3. The composition of claim 1 wherein the concentration of (b) is 11-22 millimoles, that of (c) is 0.01-1.0 parts, that of (d) is 0.01-0.2 part, that of (e) is 0.75-1.25 parts, that of (f) is 0-100 parts and that of (g) is 1-2 parts.

4. The composition of claim 1 wherein the concentration of (d) is zero, that of (c) is at least 0.01 part, that of (b) is at least 11 millimoles, and that of (g) is greater than 2 parts.

5. The composition of claim 1 wherein the concentration of (d) is zero, that of (b) is at least 5.5 millimoles, that of (g) is at least 1 part, and that of (c) is at least 0.5 part.

6. The composition of claim 1 wherein (b) is $RSO_2NHNH_2$ wherein R is selected from $C_2-C_4$ alkyl, benzyl, and phenyl substituted with $C_1-C_{12}$ alkyl or chlorine.

7. The composition of claim 1 wherein (b) is toluenesulfonyl hydrazide.

8. The composition of claim 1 wherein (c) is selected from copper octoate, copper naphthenate and vanadium decanoate.

9. The composition of claim 1 wherein the metal of the organic metal salt (d) is selected from cobalt, nickel and iron.

10. The composition of claim 9 wherein said metal is cobalt.

11. The composition of claim 9 wherein said organic metal salt (d) is selected from cobalt naphthenate and cobalt octoate.

12. The composition of claim 1 wherein (e) is a silicone-alkylene glycol copolymer.

13. The composition of claim 1 wherein (f) is selected aluminum trihydrate and calcium carbonate.

14. The composition of claim 1 wherein (g) is methyl ethyl ketone peroxide.

15. A method for preparing a foamed and cured polyester resin consisting essentially of providing a composition as in any of claims 1 to 14 by:
   (A) preparing a blend of 10-90 percent by weight of (a) with (b), (c), (d) and (f);
   (B) preparing a blend of correspondingly 90-10 percent by weight of (a) with (g);
   (C) mixing the blends resulting from steps (A) and (B) and exposing the mixture to foaming and curing conditions.

16. A composition useful for the preparation of cured and foamed polyester resin, all parts by weight, consisting essentially of
   (a) 10-100 parts polyester resin,
   (b) 2.7-32 millimoles mono-substituted sulfonyl hydrazide having the structural formula $RSO_2NHNH_2$, wherein R is $C_1$-$C_{12}$ alkyl, $C_5$-$C_6$ cycloalky, $C_7$-$C_{10}$ aralkyl, phenyl, naphthyl, or phenyl substituted with halogen, $C_1$-$C_{12}$ alkyl or $C_1$-$C_{12}$ alkoxy, (c) 0.01–1 organic metal salt wherein the metal is selected from copper and vanadium, (d) 0–0.4 part organic metal salt wherein the metal is selected from cadmium, calcium, chromium, cobalt, iron, lead, lithium, manganese, nickel, tin and zirconium, (e) 0–2 parts surface active agent, and (f) 0–250 parts filler.

17. The composition of claim 16 wherein the amount of (d) is 0–0.25 part.

18. The composition of claim 10 wherein the amount of (d) is 0.01–0.2 part.

* * * * *